United States Patent
Brubacher et al.

(10) Patent No.: US 10,404,641 B2
(45) Date of Patent: *Sep. 3, 2019

(54) INTERNET E-MAIL BRIDGE

(71) Applicant: Microsoft Technology Licensing, LLC, Redmond, WA (US)

(72) Inventors: Douglas K. Brubacher, Sammamish, WA (US); Luciano Passuello, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/637,856

(22) Filed: Jun. 29, 2017

(65) Prior Publication Data
US 2017/0302608 A1    Oct. 19, 2017

Related U.S. Application Data

(63) Continuation of application No. 14/603,520, filed on Jan. 23, 2015, now Pat. No. 9,742,717, which is a (Continued)

(51) Int. Cl.
*G06Q 10/10*    (2012.01)
*H04L 12/58*    (2006.01)
*H04L 29/08*    (2006.01)

(52) U.S. Cl.
CPC .......... *H04L 51/22* (2013.01); *G06Q 10/107* (2013.01); *H04L 51/066* (2013.01); *H04L 51/36* (2013.01); *H04L 67/10* (2013.01)

(58) Field of Classification Search
CPC ....... H04L 51/066; H04L 51/36; H04L 51/22; H04L 51/00; G06Q 10/107
See application file for complete search history.

(56) References Cited

U.S. PATENT DOCUMENTS 6,195,686 B1    2/2001  Moon et al.
6,205,471 B1    3/2001  Gilchrist et al.
(Continued)

OTHER PUBLICATIONS

"Advisory Action Issued in U.S. Appl. No. 10/097,286", dated May 30, 2006, 4 Pages.
(Continued)

*Primary Examiner* — David R Lazaro
(74) *Attorney, Agent, or Firm* — Merchant & Gould P.C.

(57) ABSTRACT

An Internet mail bridge is provided for downloading e-mail messages from Internet mail servers supporting different email protocols, such as the Post Office Protocol 3 (POP3) and Web Distributed Authoring and Versioning (Web DAV) protocol, and delivering the downloaded messages, which are in different formats, to a mail server on a local area network. The Internet mail bridge has a mail manager that is independent from particular e-mail protocols or e-mail formats. For each e-mail account, the mail manager instantiates a mail connector object that contains logic for downloading e-mail according to the e-mail access protocol of that account, and invokes the mail connector object to download e-mail messages from that account. The mail manager then instantiates and invokes mail deliverer objects tailored for handling different message formats to deliver the downloaded messages to the local mail server.

20 Claims, 7 Drawing Sheets

Related U.S. Application Data continuation of application No. 12/983,774, filed on Jan. 3, 2011, now Pat. No. 8,943,148, which is a continuation of application No. 10/097,286, filed on Mar. 14, 2002, now Pat. No. 7,865,554.

(56) References Cited

U.S. PATENT DOCUMENTS

| | | | |
|---|---|---|---|
| 6,223,213 | B1 | 4/2001 | Cleron et al. |
| 6,266,692 | B1 | 7/2001 | Greenstein |
| 6,330,589 | B1 | 12/2001 | Kennedy |
| 6,336,138 | B1* | 1/2002 | Caswell ............... H04L 41/12 345/440 |
| 6,460,075 | B2 | 10/2002 | Krueger et al. |
| 6,601,088 | B1 | 7/2003 | Kelley et al. |
| 6,684,088 | B1 | 1/2004 | Halahmi |
| 6,871,215 | B2 | 3/2005 | Smith et al. |
| 6,947,991 | B1 | 9/2005 | Burton et al. |
| 7,269,624 | B1* | 9/2007 | Malik ............... G06Q 10/107 709/206 |
| 7,284,045 | B1 | 10/2007 | Marl et al. |
| 7,346,649 | B1* | 3/2008 | Wong ............... G06F 17/30867 707/E17.109 |
| 7,865,554 | B2 | 1/2011 | Brubacher et al. |
| 8,943,148 | B2 | 1/2015 | Brubacher et al. |
| 9,742,717 | B2 | 8/2017 | Brubacher et al. |
| 2002/0087704 | A1 | 7/2002 | Chesnais et al. |
| 2002/0174194 | A1* | 11/2002 | Mooney ............... H04L 51/36 709/219 |
| 2003/0177188 | A1* | 9/2003 | Brubacher ............ H04L 51/066 709/206 |
| 2005/0188046 | A1* | 8/2005 | Hickman ............ G06Q 10/107 709/206 |
| 2010/0211635 | A1* | 8/2010 | DeAnna ............... G06F 9/465 709/203 |

OTHER PUBLICATIONS

"Amendment and Response Filed in U.S. Appl. No. 10/097,286", filed May 15, 2006, 15 Pages.
"Amendment and Response Filed in U.S. Appl. No. 10/097,286", filed Dec. 7, 2005, 15 Pages.
"Amendment and Response Filed in U.S. Appl. No. 10/097,286", filed Jul. 15, 2010, 14 Pages.
"Amendment and Response Filed in U.S. Appl. No. 10/097,286", filed Oct. 2, 2009, 12 Pages.
"Amendment and Response Filed in U.S. Appl. No. 10/097,286", filed Mar. 23, 2009, 12 Pages.
"Appeal Brief Filed U.S. Appl. No. 10/097,286", filed Jan. 11, 2007, 21 Pages.
"Appeal Brief Filed U.S. Appl. No. 10/097,286", filed Aug. 14, 2006, 19 Pages.
"Examiner's Answer to Appeal Brief Issued in U.S. Appl. No. 10/097,286", dated May 14, 2007, 33 Pages.
"Examiner's Answer to Appeal Brief Issued in U.S. Appl. No. 10/097,286", dated Nov. 3, 2006, 32 Pages.
"Final Office Action Issued in U.S. Appl. No. 10/097,286", dated Mar. 14, 2006, 25 Pages.
"Final Office Action Issued in U.S. Appl. No. 10/097,286", dated Jan. 15, 2010, 20 Pages.
"Non Final Office Action Issued in U.S. Appl. No. 10/097,286", dated Apr. 2, 2009, 21 Pages.
"Non Final Office Action Issued in U.S. Appl. No. 10/097,286", dated Sep. 7, 2005, 13 Pages.
"Notice of Allowance Issued in U.S. Appl. No. 10/097,286", dated Aug. 30, 2010, 7 Pages.
"Patent Board Decision Issued in U.S. Appl. No. 10/097,286", dated Jan. 26, 2009, 15 Pages.
"Reply Brief Filed in U.S. Appl. No. 10/097,286", filed Jul. 16, 2007, 10 Pages.
"Reply Brief Filed in U.S. Appl. No. 10/097,286", filed Jan. 3, 2007, 5 Pages.
"Amendment after Allowance Filed in U.S. Appl. No. 12/983,774", filed Dec. 11, 2014, 3 Pages.
"Amendment and Response Filed in U.S. Appl. No. 12/983,774", filed Aug. 19, 2014, 9 Pages.
"Amendment and Response Filed in U.S. Appl. No. 12/983,774", filed Jan. 13, 2014, 11 Pages.
"Amendment and Response Filed in U.S. Appl. No. 12/983,774", filed Sep. 6, 2013, 10 Pages.
"Amendment and Response Filed in U.S. Appl. No. 12/983,774", filed Feb. 11, 2013, 12 Pages.
"Final Office Action Issued in U.S. Appl. No. 12/983,774", dated May 20, 2014, 9 Pages.
"Final Office Action Issued in U.S. Appl. No. 12/983,774", dated Jun. 6, 2013, 8 Pages.
"Non Final Office Action Issued in U.S. Appl. No. 12/983,774", dated Oct. 9, 2012, 15 Pages.
"Non Final Office Action Issued in U.S. Appl. No. 12/983,774", dated Sep. 12, 2013, 8 Pages.
"Notice of Allowance Issued in U.S. Appl. No. 12/983,774", dated Sep. 12, 2014, 5 Pages.
"Response to Rule 312 Communication Issued U.S. Appl. No. 12/983,774", dated Dec. 18, 2014, 2 Pages.
"Non Final Office Action Issued in U.S. Appl. No. 14/603,520", dated Oct. 6, 2016, 8 Pages.
"Notice of Allowance Issued in U.S. Appl. No. 14/603,520", dated Apr. 7, 2017, 5 Pages.
Resnick, P., "Internet Message Format", in Proceedings of Network Working Groups, Request for Comments: 5322, Obsoletes: 2822, Updates: 4021, Oct. 2008, 57 Pages.
U.S. Appl. No. 14/603,520, Amendment and Response filed Jan. 6, 2017, 8 pages.
U.S. Appl. No. 14/603,520, Amendment after Allowance filed Jul. 7, 2017, 6 pages.

* cited by examiner

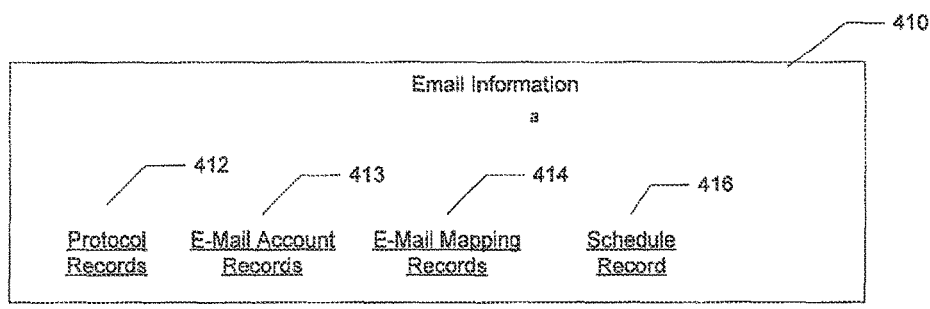

FIG. 4

Protocol Record (412)

| Record field | Description |
| --- | --- |
| Protocol ID | Identifies one of the email protocols supported by the system |
| Connector-GUID | Identifies the email-connector supporting the email protocol identified by the protocol ID |
| Deliverer-GUID | Identifies the email-deliverer supporting the email format corresponding to the email protocol identified by the protocol ID |

FIG. 5

E-Mail Account Record — 413

| Record field | Description |
|---|---|
| Account ID | Unique ID of the Account |
| Protocol ID | Defines the mail box protocol, and provides a link to the connector and deliverer |
| Type | Defines the logical mail box type. For example, Type =1 for user mail box Type =2 for global mail box |
| Account | Account credentials to connect to the Internet mail box |
| Password | Password credentials to connect to the Internet mail box |
| Hostname | ISP hostname credentials to connect to the Internet mail box |
| Authentication method | Authetication method to connect to the Interent mail box, for examle, 1=Basic authentication; 2=Authenticated POP; 3= CRAM-MD5 encryption |
| Mapping to | Mapping destination for the type user mail box |
| Port number | Port number to connect to the Internet mail box |

610 — Account ID
620 — Protocol ID
630 — Type
640 — Account
650 — Password
660 — Hostname
670 — Authentication method
680 — Mapping to
690 — Port number

FIG. 6

E-Mail Mapping Record — 414

| Record field | Description |
|---|---|
| E-Mail Box ID | Used for global mail box type |
| Mapping ID | Unique ID of mapping method |
| Mapping from | Match original destinations meant for messages sent to a global mailbox |
| Mapping to | New destination specific message in a global mail box should be routed to |

710 — E-Mail Box ID
720 — Mapping ID
730 — Mapping from
740 — Mapping to

FIG. 7

Schedule Record — 416

| Record field | Description |
|---|---|
| Schedule | (E.g., a stream of bits indicating whether to download at corresponding 15-minutes intervals for the week) |

810 — Schedule

FIG. 8

INTERNET E-MAIL BRIDGE

CROSS-REFERENCE TO RELATED APPLICATIONS

This application is a continuation of U.S. Pat. No. 9,742,717, filed Jan. 23, 2015, and entitled "Internet E-Mail Bridge," which application is a continuation of U.S. Pat. No. 8,943,148, filed Jan. 3, 2011, and entitled "Internet Email Bridge," which application is a continuation of U.S. Pat. No. 7,865,554, filed Mar. 14, 2002, and entitled "Internet E-Mail Bridge," the entireties of which are incorporated by reference herein.

FIELD OF THE INVENTION

This invention is generally related to network electronic mail services, and more particularly the downloading and delivery of electronic mail messages from Internet mail servers using different electronic mail access protocols and message formats.

BACKGROUND OF THE INVENTION

Transmitting electronic mail (e-mail) messages is one of the major functions served by the Internet. With its phenomenal growth in the late 1990s, the Internet has replaced several proprietary e-mail messaging systems and become the ubiquitous global network for e-mail messaging.

Due to the cost and technical complexity involved in hosting an e-mail server on the Internet, many small business entities and individual users do not host their own Internet e-mail servers. Instead, they use Internet mail servers provided by their Internet Service Providers (ISPs) to transmit and receive e-mail messages to and from the Internet. In such an arrangement, Internet e-mail messages destined for users on the local area network (LAN) of a business entity are first routed through the Internet to the ISP's Internet mail server and held in a mailbox for that business entity. A mail server of the local area network then uses a mail connector software module to connect to the Internet mail server of the ISP and download the e-mail messages from the mailbox at the Internet mail server, and distributes the downloaded messages to their intended recipients.

Currently, most mail servers implement the Post Office Protocol Version 3 (POP3) for handling the exchange of e-mail messages, and the mail connector used for downloading e-mail messages from the Internet mail server is programmed to operate according to the POP3 requirements. Other e-mail access protocols have been proposed, however, with the intent to provide enhanced e-mail messaging functionality. One example is the Web Distributed Authoring and Versioning (Web DAV) protocol. Those e-mail access protocols not only define different e-mail access operations but also use different message formats. For instance, the POP3 requires e-mail messages to be in the Internet Message Format (IMF) defined in RFC 822 of the Internet Engineering Task Force (IETF), while the Web DAV protocol requires the e-mail messages to be in the Extensible Markup Language (XML) format.

Due to the importance of Internet e-mail messaging, more e-mail access protocols and message formats will likely be proposed and implemented in the future. It is expected that a local area network may have e-mail accounts with multiple Internet mail servers that support different e-mail access protocols. Thus, the mail connector software has to have the ability to access e-mail messages at the Internet mail servers according to the different protocols and the ability to handle different message formats. From the viewpoint of a software developer, however, it is desirable to minimize the amount of reprogramming work that has to done to modify the mail connector software or the like to provide support for new e-mail access protocols and message formats. Accordingly, there is a need for a software module for use by a local mail server to access e-mail messages at Internet mail servers that can be easily extended to support various e-mail access protocols and message formats.

SUMMARY OF THE INVENTION

In view of the forgoing, the present invention provides an Internet e-mail bridge for downloading e-mail messages from multiple Internet e-mail servers that support different e-mail access protocols and message formats, and delivering the downloaded messages to a mail server of a local area network. The e-mail bridge has a mail manager that uses different mail connector objects for downloading e-mail messages from the Internet mail servers according to their respective e-mail access protocols, and uses different mail deliverer objects for delivering the downloaded messages according to the message formats of the messages.

At a scheduled time for downloading e-mail messages from the Internet mail servers, the mail manager of the Internet mail bridge retrieves e-mail account information for the e-mail accounts at the Internet mail servers. The account information for each account identifies the e-mail access protocol used by that account. Based on that protocol information, the mail manager instantiates a mail connector object that supports a method for downloading messages according to the e-mail access protocol of that account. The mail connector object for each mail account is then invoked to download e-mail messages in that account from the respective Internet mail server, and the downloaded e-mail messages are stored temporarily in a mail queue with data identifying the e-mail access protocol used.

The mail manager then delivers the downloaded messages in the mail queue to the mail server of the local area network. To that end, the mail manager instantiates a mail deliverer object for each format type of the messages in the mail queue. The mail manager retrieves each mail message with its protocol information from the mail queue, and invokes the mail deliverer object for delivering messages in the format of that message to deliver the message to the mail server of the local network.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 is a schematic diagram showing an e-mail information store that contains data used in downloading and delivering e-mail messages from multiple Internet e-mail accounts that support different e-mail access protocols;

FIG. 5 is a schematic diagram showing a protocol record stored in the e-mail information store of FIG. 4;

FIG. 6 is a schematic diagram showing an e-mail account record stored in the e-mail information store of FIG. 4;

FIG. 7 is a schematic diagram showing an e-mail mapping record stored in the e-mail information store of FIG. 4;

FIG. 8 is a schematic diagram showing a schedule record stored in the e-mail information store of FIG. 4.

DETAILED DESCRIPTION OF THE INVENTION

Figure 1:
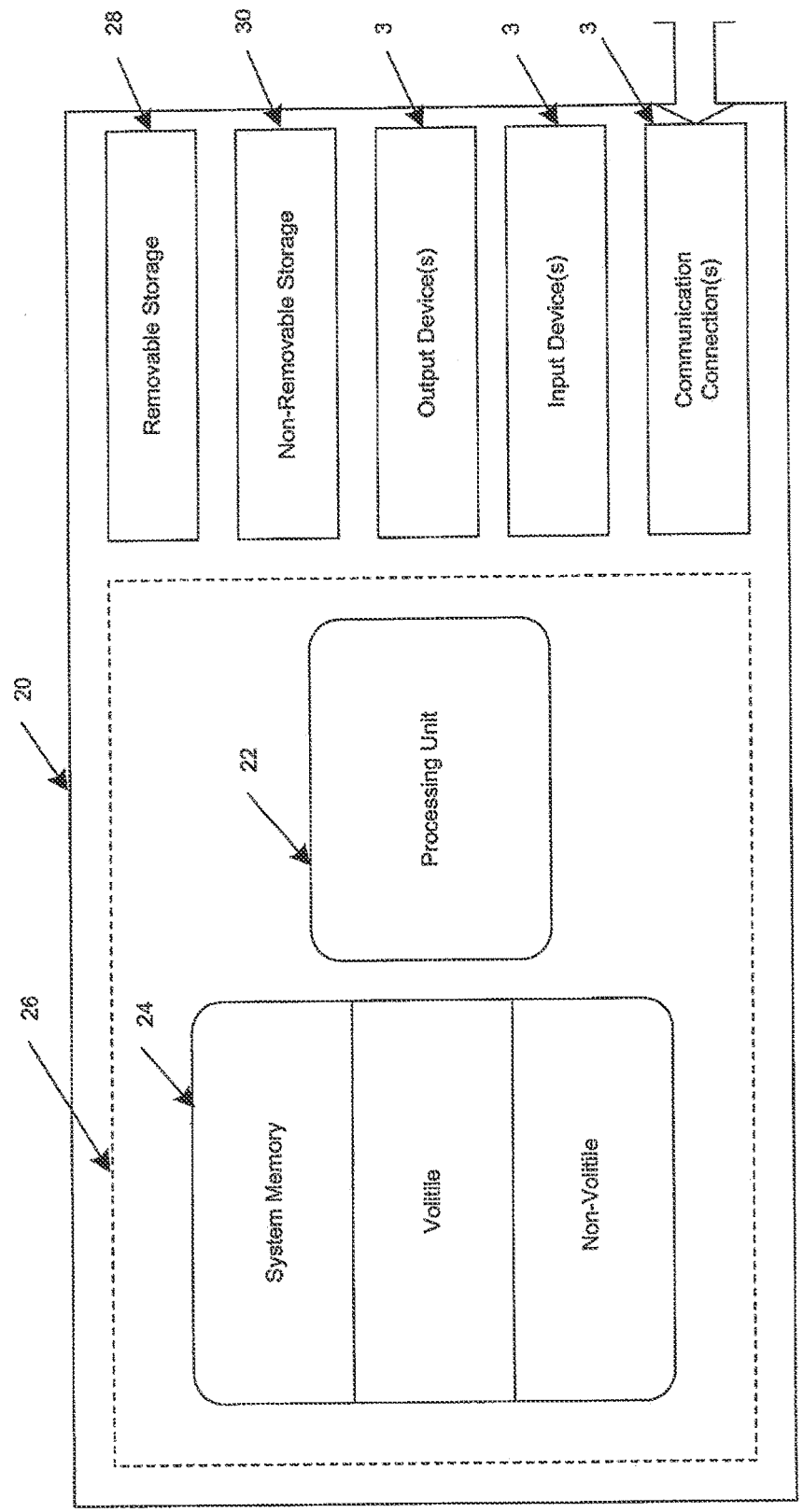
FIG. 1 is schematic diagram showing a simplified architecture of a computing device upon which an embodiment of the invention may be implemented.

Referring now to the drawings, FIG. 1 shows an exemplary computing device 20 that may be used for implementing embodiments of the invention, which will be described in greater detail with reference to FIGS. 2-9. In its most basic configuration, computing device 20 typically includes at least one processing unit 22 and memory 24. Depending on the exact configuration and type of the computing device, the memory 24 may be volatile (such as RAM), non-volatile (such as ROM, flash memory, etc.) or some combination of the two. Additionally, the computing device 20 may have other components. For example, the device 12 may include an additional removable storage 28 and/or non-removable storage 30, such as magnetic or optical disks, tape, and other types of writable electrical storage media. Suitable Computer storage media include, but are not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the computing device 20. Any such computer storage media may be part of, or used in conjunction with, the computing device 20.

The computing device 20 may also contain one or more communication connections 38 that allow the device to communicate with other devices. The communications connections 38 may carry information in various communication media. The communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The computing device 20 may also have input devices 34 such as keyboards, mouse, pen, touch input device, etc. One or more output devices 36 such as a display, speakers, printer, etc. may also be included. All these devices are well known in the art and need not be discussed at greater length here.

Figure 2:
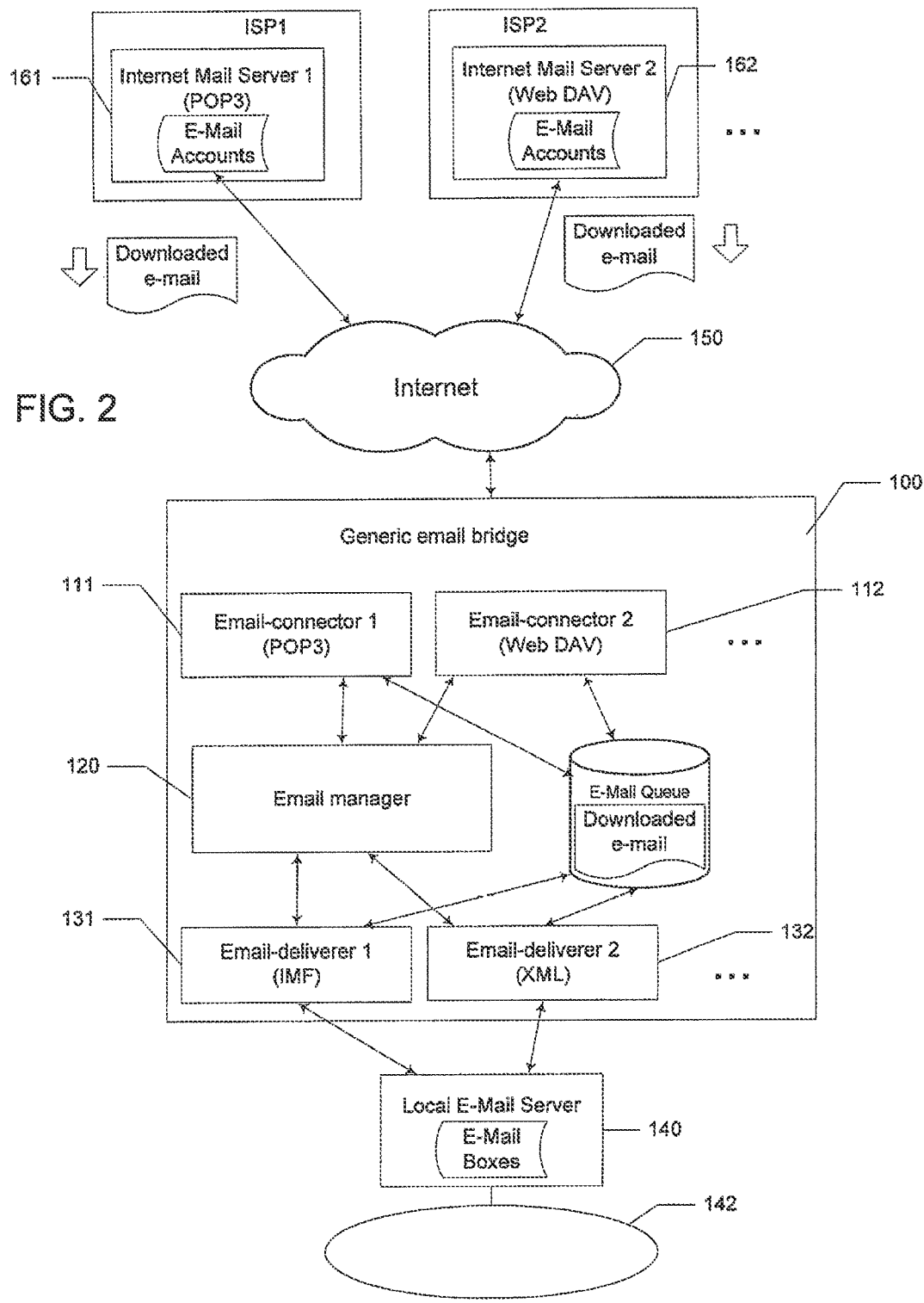
FIG. 2 is a schematic diagram showing an Internet e-mail bridge of the invention in an exemplary operation environment.

Turning now to FIG. 2, the present invention is directed to an Internet e-mail bridge 100 for downloading e-mail messages from multiple Internet e-mail servers under different e-mail access protocols and delivering the downloaded e-mail messages to an e-mail server 140 on a local area network 142. The e-mail bridge 100 communicates with Internet e-mail servers 161 and 162. In a typical arrangement, the Internet mail servers may be hosted by an ISP 160 that provides Internet access to the local area network 142. For simplicity of illustration, only two Internet mail servers 161 and 162 are shown in FIG. 2, but it will be appreciated that more Internet mail servers may be used. The local area network 142 has one or more e-mail accounts at each of the Internet mail servers, which maintains a mailbox for each e-mail account. E-mail messages directed to users on the local area network are routed through the Internet 150 to the Internet mail servers 161 and 162. The e-mail messages are then downloaded by the mail bridge 100 and delivered to the e-mail server 140 of the local area network. Thereafter, users in the local network can retrieve their e-mail messages from the local mail server.

In accordance with an important aspect of the invention, the Internet e-mail servers support different e-mail access protocols. By way of example, as illustrated in FIG. 2, the Internet mail server 161 supports the Post-Office-Protocol Version 3 (POP3), while the Internet mail server 162 supports the Web Distribution and Authoring Versioning (Web DAV) protocol. The different mail access protocols often require different message formats. For instance, the POP3 messages are in the Internet Message Format (IMF), and the Web DAV messages are in the Extensible Markup Language (XML) format.

In accordance with a feature of the invention, the Internet mail bridge 100 has an architecture that enables the Internet mail bridge to be easily extended to handle different e-mail access protocols and message formats without the need for any reprogramming. Rather, all that is needed is to add new code for the objects to handle the protocol-specific or format-specific differences, as described below. Specifically, the mail manager 120 of the mail bridge 100 is "generic" in that it does not contain the logic for handling the downloading or delivery of e-mail messages according to any specific e-mail access protocol or message format. Rather, it delegates the operations of downloading e-mail messages from the Internet mail servers to protocol-specific mail connector objects, and delegates the operations of delivering the downloaded messages to the local server 140 to format-specific mail deliverer objects.

More particularly, to download e-mail messages from the Internet mail server, the mail manager 120 instantiates mail connector objects for the respective e-mail accounts at the Internet mail server. Each mail connector object is an instance of a mail connector class that defines a method for downloading e-mail messages according to a particular e-mail access protocol. Thus, in the example illustrated in FIG. 2, a mail connector 111 is instantiated for an account at the Internet mail server 161 and contains logic for downloading e-mail messages according to the POP3 protocol, and another mail connector 112 is instantiated an account at the Internet mail server 162 and contains logic for downloading e-mail messages according to the Web DAV protocol.

After initiating the appropriate mail connectors for the respective accounts at the Internet mail servers, the mail manager invokes the mail connectors to download the e-mail messages in those accounts. The downloaded messages are temporarily stored in a mail queue of the mail bridge. To facilitate the delivery of the messages to the local mail server, each message is stored in the mail queue with data identifying the protocol used for downloading the message.

As mentioned above, the different e-mail access protocols typically require different message formats. Similar to the aspect of downloading, the mail manager 120 does not contain logic for delivering downloaded e-mail messages in different formats to the mail server 140 of the local network 142. Rather, the format-dependent delivery operations are delegated to mail deliverer objects, each of which contains format-specific logic for handling a delivery operation. After the e-mail messages are downloaded into the message queue, the mail manager instantiates for each format of the messages in the message queue a mail deliverer object for delivering messages of that format. The mail deliverer object for a given message format is an instance of a mail deliverer class that defines a method for delivering a message in the specific message format of that message to the local mail server 140. The mail delivery object is then invoked to deliver the message to the local mail server. Thus, in the example of FIG. 2, a mail deliverer object 131 is instantiated for delivering e-mail messages in the IMF format, and a mail deliverer object 132 is instantiated for delivering other e-mail messages in the XML format.

Figure 3:
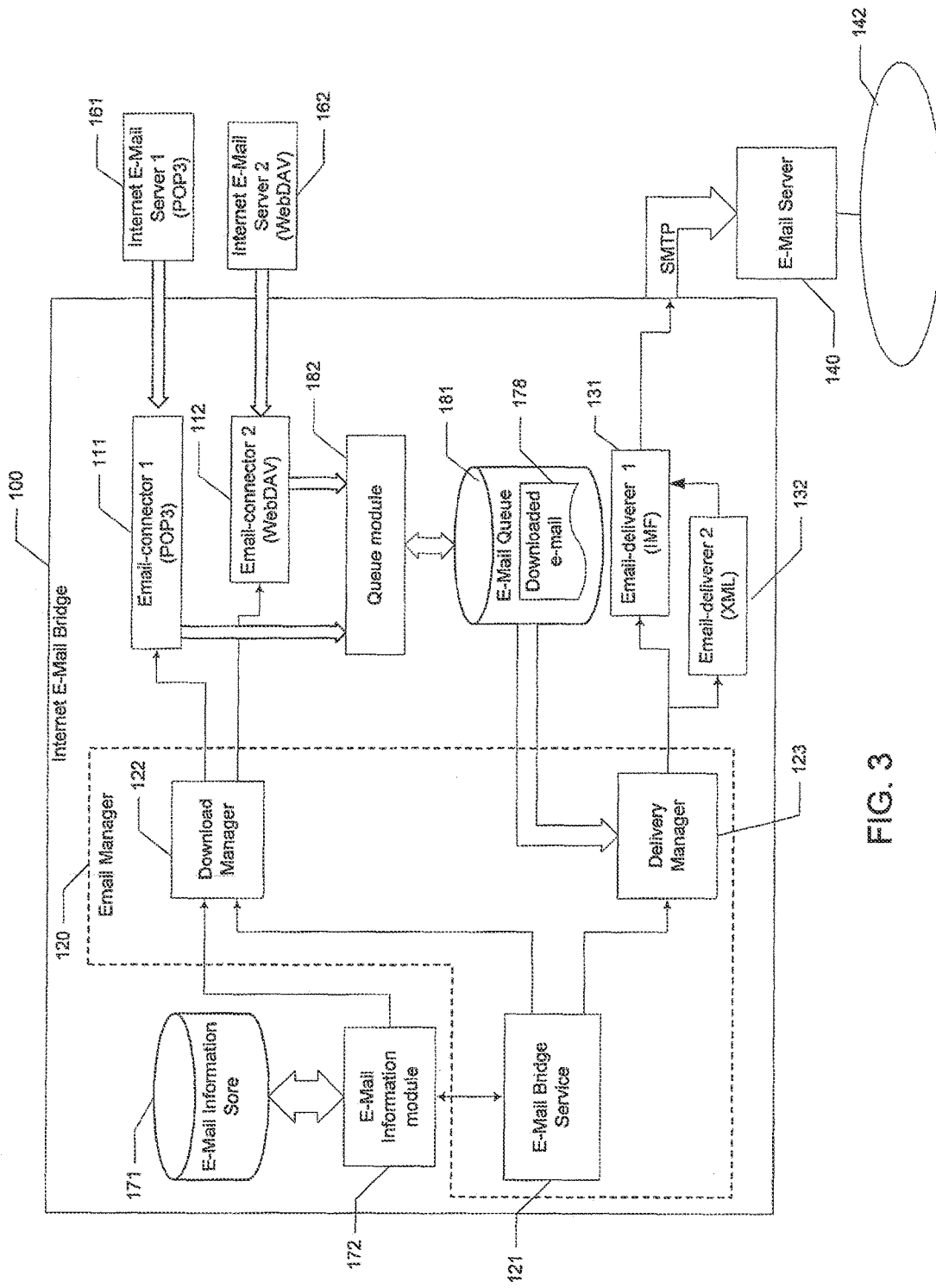
FIG. 3 is a schematic diagram showing an embodiment of the Internet e-mail bridge.

Referring to FIG. 3, in a preferred embodiment of the Internet mail bridge 100, the mail manager 120 is further divided into three components: a bridge service 121, a download manager 122, and a delivery manager 123. The mail bridge 100 further includes an account information store 171 for storing account information for e-mail accounts at the Internet mail servers, and an account information module 172 that is used to manage and retrieve the account information in the account information store 171. In this embodiment, as in the example of FIG. 2, the Internet e-mail servers 161 and 162 support the POP3 and Web DAV e-mail access protocols, respectively. As a result, e-mail messages received by the Internet e-mail server 161 are in the IMP format, and e-mail messages received by the Internet e-mail server 162 are in the XML format.

Upon system startup, the bridge service 121 loads a connector schedule from a data access layer that is used to read information from the file system. This connector schedule indicates when the mail bridge 100 is to download and deliver e-mail messages from accounts at the Internet mail servers 161 and 162. The bridge service 121 also initializes the mail delivery manager 123. In one implementation, the mail delivery manager is an out-of-process COM object that implements an IDeliveryManager interface. The main function of the mail delivery manager 123 is to drive the delivery of downloaded mail messages stored in the mail queue 181 by the mail download manager 122. The bridge service 121 signals a named delivery event to initiate the processing of mail delivery by the mail delivery manager 123. The mail delivery manager object will be released once the named delivery event has been reset, and all mail in the delivery queue has been delivered.

At a scheduled mail download time, as specified by the connector schedule, the bridge service 121 instantiates the mail download manager 122. In one implementation, the mail download manager is an out-of-process COM object that implements an IDownloadManager interface and supports a DownloadMail method. The main function of this object is to drive the downloading of e-mail messages from the various accounts at the Internet mail servers. The bridge service 121 then invokes the DownloadMail method to initiate the downloading process. In that process, the download manager 122 first reads the account information for the Internet e-mail accounts from the account information store 171. As will be described in greater detail below, the account information for each e-mail account includes a GUID that identifies the type of mail connector object to be instantiated. The download manager then creates for each mail account a thread that instantiates an appropriate mail connector object corresponding to the GUID in the account information for downloading e-mail messages from that account. In one implementation, a thread pool is established for mail downloading, and mail connector objects are instantiated for respective mail accounts up to the maximum number of threads in the thread pool. The remaining accounts are then handled as threads are released and become available. One advantage of using mail download objects for the e-mail accounts in separate threads is that the downloading from multiple accounts can be performed simultaneously, up to the maximum number of threads in the thread pool.

As described above, the mail connector object created for a given Internet e-mail account is based on a class defined specifically to handle the downloading of e-mail messages according to the e-mail access protocol of that account. For instance, in the illustrated example, the Internet mail servers 161 and 162 supports the POP3 and Web DAV e-mail access protocols, respectively. Thus, for each e-mail account at the Internet mail server 161, a mail connector object 111 is created for downloading e-mail from the account under the POP3. In one implementation, each mail connector object implements an IMailConnector interface that supports a DownloadMail method. To download the mail in a given account, the download manager 122 invokes the IMailConnector::DownloadMail method in the corresponding download connector object, which then connects to the specified Internet mail server and downloads all mail in the account to the mail queue 181. After the e-mail messages are successfully downloaded to the mail queue 181, the messages are deleted from the mailbox of the Internet mail server.

The mail connectors place the downloaded messages in the mail queue 181 in their native formats. As mentioned above, each e-mail access protocol may require a particular message format. Thus, the messages 178 in the mail queue 181 may be in different formats. To keep track of the formats of the downloaded messages, each message in the mail queue 181 is stored together with protocol information that is used to identify the protocol used to download the message. As described below, the protocol information of each message is used to identify a proper type of mail deliverer object that supports the delivery of a message in that message format. In one implementation, the protocol information data for each downloaded message in the mail queue 181 is simply the extension portion of the file name for the file in which the message is stored. For instance, messages downloaded using the POP3 protocol may be stored with a file extension of ".1", and messages downloaded using the Web DAV protocol may be stored with a file extension of ".2".

To deliver the downloaded e-mail messages to the local mail server 140, the bridge service 121 invokes the InitializeDelivery method of the mail delivery manager 122. In response, the mail delivery manager first instantiates an appropriate mail deliverer object for each format type of the messages in the mail queue 181. As described above, the mail deliverer object is created based on a class that is programmed to handle the particular format of the mail message. In a preferred embodiment, only one mail deliverer object is instantiated for each type of mail messages. For instance, in the example shown in FIG. 3, a single IMF deliverer object and a single WebDAV/XML deliverer object are instantiated for mail delivery. Each mail deliverer object is then reused for each message of that type found in the mail queue.

To determine which mail deliverer object should be used to deliver a message, the mail delivery manager 122 first queries the mail queue module 172 for the message and its protocol ID, and then identifies a mail deliverer object of the type corresponding to the protocol ID. A Deliver method of the mail deliverer object is then invoked to deliver the mail message to local mail server 140.

Although the downloaded messages are in different message formats, the mail server 140 on the local area network may not support each of the possible mail formats. For instance, in the illustrated implementation in FIG. 3, the local mail server 140 as designed supports only the IMF format. Thus, further processing is required for non-IMF messages before they can be placed in the mail queue of the mail server 140. In a preferred embodiment, the work of the non-IMF mail deliverer objects is simplified by leveraging the mail deliverer object for IMF messages. As shown in FIG. 3, to deliver e-mail messages in the IMF, the mail delivery manager 2.0 has invoked a mail deliverer object 131 based on a class that contains logic for delivering e-mail messages in the IMF format. Taking advantage of the existence of this mail delivery object, mail delivery objects invoked for delivering e-mail messages in non-IMF formats simply convert the messages into the IMF format, and then call the IMF mail deliverer object 131 to deliver the converted messages to the local mail server 140. For instance, to deliver a mail message in the XML format downloaded by the mail connector 112 under the Web DAV protocol, the corresponding mail deliverer object 132 converts the message into the IMF format, and then calls the IMF mail deliverer 131 to deliver the converted message. This arrangement promotes code reuse and avoids potential redundant bugs in the mail deliverer classes for the non-IMF formats.

After the e-mail messages are delivered to the mail server 140, users on the local area network 142 can then retrieve their messages from the mailboxes of the mail server 140 using, for example, the Outlook program of the Microsoft Corporation.

Several data structures used by the Internet mail bridge 100 in the embodiment of FIG. 3 for downloading and delivering e-mail messages are now described with reference to FIGS. 4-8, Referring to FIG. 4, the e-mail information 410 stored in the account information store 171 (FIG. 3) includes protocol records 412, e-mail account records 413, and e-mail mapping records 414, and a schedule record 416.

Each protocol record 412 identifies an e-mail access protocol supported by the system. Referring to FIG. 5, the protocol record 412 has a protocol ID field 510 that contains a unique identifier for the e-mail access protocol. The record further includes a connector GUID that identifies the COM object that handles the protocol-specific connector functionality for downloading e-mail according to the protocol, and a deliverer GUID that identifies the COM object that handles the format-specific delivery functionality for the protocol. These GUIDs tell the mail download manager and the mail delivery manager what types of mail connector and mail deliverer objects should be instantiated for downloading and delivering messages of the given protocol.

Referring to FIG. 6, there is an e-mail account record 413 for each of the e-mail accounts the local area network has at the Internet mail servers. Each email account record contains the account information for the corresponding e-mail account. The account information includes an identifier 610 for the account, a protocol ID 620 identifying the e-mail access protocol for this account. Using this protocol ID, the mail download and delivery managers can obtain from the protocol record 412 the GUIDs of the connector and deliverer objects to be used to download and deliver e-mail messages of this protocol. A Type field 630 identifies the logical mailbox type for this account. The account record 413 further includes fields 640, 650, 660, 670 containing security information to be used for connecting to the corresponding mailbox at the Internet mail server. The Account field 640 specifies the e-mail account credentials, which could be a user name or logging name of the account. The Password field 650 stores the password for the e-mail account. The Hostname field 660 identifies the name of the ISP that hosts the Internet e-mail account. The Authentication Method field 670 specifies the authentication method to be used for connecting to the Internet mail server. If the mailbox of this account is of a User type, the account record 413 also has a MappingTo field 680 that identifies a destination mailbox to which the account mailbox is mapped. The PortNumber field 690 defines the port number to be used for connecting to the Internet e-mail account.

Referring now to FIG. 7, the mail mapping records are for mapping Internet mailboxes that are of the Global mailbox type. Each mail mapping record includes an MailboxID field 710 containing the mailbox ID, a MappingID field 720 that specifies the mapping method, a "MappingFrom" field 730 identifying the original destination meant for the messages sent to the global mailbox, and a "Mapping To" field 750 that defines the new destination to which the e-mail messages in a global Internet e-mail account should be routed.

Figure 9:
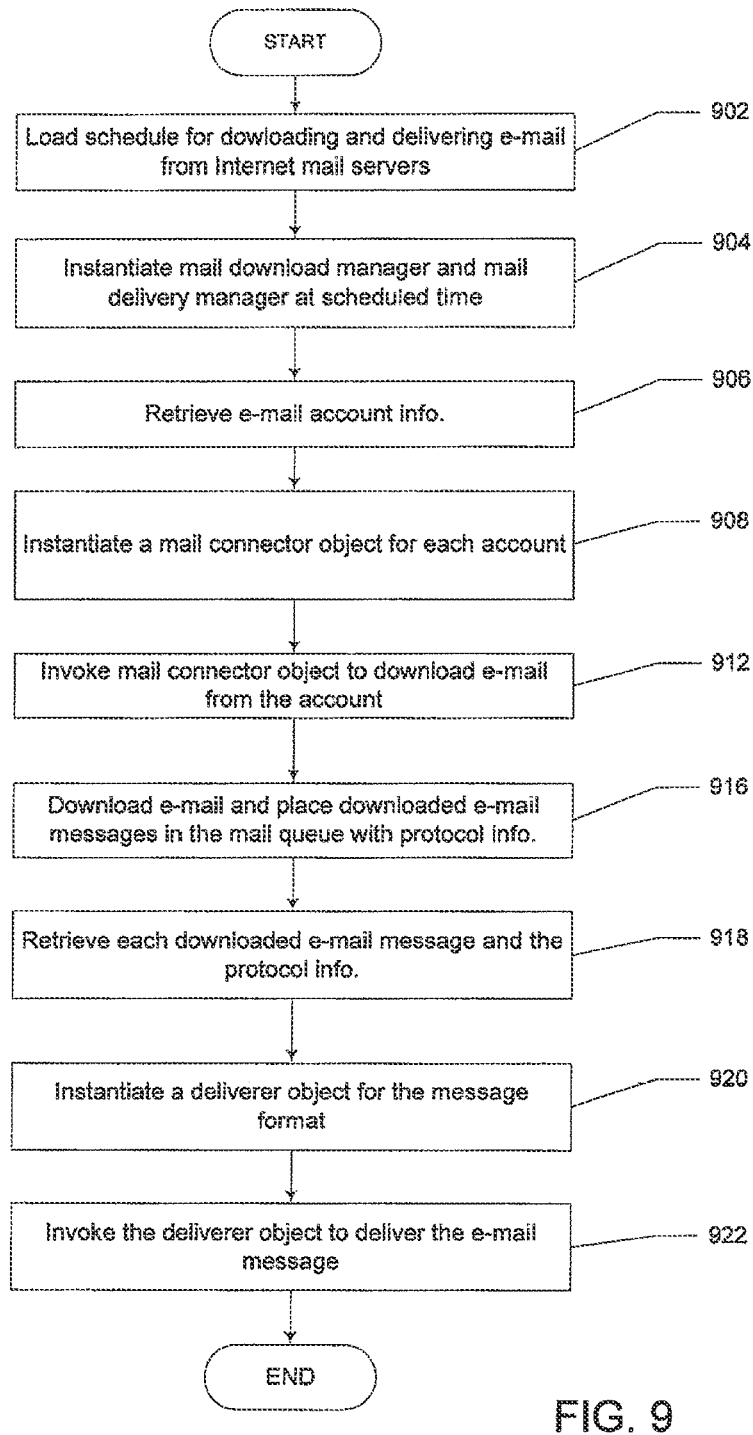
FIG. 9 is a flow diagram showing the steps executed by the Internet mail bridge in downloading and delivering e-mail messages from multiple Internet e-mail accounts of different protocols.

Referring to FIG. 8, the schedule record 416 is used to store the scheduling information for determining when the bridge service should fire a download and delivery event. For instance, in one implementation, the schedule is fixed at 15-minute increments, and the Schedule field in the record contains data 810 in the form of a stream of bits, each indicating whether a download should occur for a corresponding 15-minute interval or not. FIG. 9 summarizes the process of downloading and delivering e-mail messages performed by the mail bridge 100 in the embodiment of FIG. 3, using the data structures in FIGS. 4-8. At start of the system, the e-mail bridge service 121 retrieves the schedule information from schedule record 416 and determines when to initiate a downloading operation (step 902). At a scheduled time the bridge service 121 instantiates the download manager 122 and delivery manager 123 (step 904). Upon initialization, the download manager 12 retrieves the e-mail account record 413 for each e-mail account (step 906). Using the protocol ID in the e-mail account record 413, the mail download manager retrieves the corresponding protocol record 412 and obtains the connector GUID in that protocol record.

The mail download manager then instantiates a mail connector object corresponding to that GUID (step 908). This connector object contains the logic for downloading e-mail messages from the corresponding account under the protocol identified by the protocol ID. For example, the email-connector 111 of supporting the POP3 is instantiated for downloading e-mail messages from an account at the Internet e-mail server 161, which supports the POP3 protocol. Similarly, the Web DAV-specific e-mail connector object 112 is instantiated for downloading e-mail messages from the Internet e-mail server 162, which supports the Web DAV protocol. The download manager then invokes the mail connector object to download e-mail from the Internet mailbox for that account (step 912). The mail connector object connects to the Internet mail server and uses the account credentials, password, host name, and authentication method data in the account record 413 to log onto the Internet mail server. After logging onto the Internet mail server, the mail connector downloads the e-mail messages in the account, and places the downloaded mail messages in the mail queue 181 together with data identifying the protocol used for the download (step 916).

As mentioned above, for each message format type in the mail queue, the delivery manager instantiates a mail deliverer object for delivering messages of that format to the local mail server. To that end, the mail delivery manager first retrieves the message with its protocol information (step 918). The mail delivery manager then selects a mail deliverer object according to the deliverer GUID of the protocol identified by the protocol information (step 920). The mail delivery manager then invokes the deliverer object to deliver the message to the local mail server (step 922).

In view of the foregoing, it can be appreciated that the present invention provides an Internet mail bridge capable of downloading and delivering e-mail messages from Internet e-mail accounts at multiple Internet e-mail servers that support different e-mail protocols. The Internet mail bridge uses a generic mail manager to instantiate and invoke protocol-specific connector objects to handle the protocol-dependent downloading operations, and format-specific deliverer objects to handle the delivery of downloaded messages in different formats. This architecture allows the Internet mail bridge to be easily extended to add support for a new e-mail access protocol by simply adding new types of mail connector and deliver objects.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A system comprising:
   at least one processor; and
   memory encoding computer executable instructions that, when executed by the at least one processor, perform a method of retrieving messages from a first account and a second account, the method comprising:
      retrieving a first message from the first account supporting a first protocol, wherein the first message is retrieved by invoking a first method having logic for retrieving the first message according to the first protocol;
      retrieving a second message from the second account supporting a second protocol, wherein the second protocol is different from the first protocol, and wherein the second message is retrieved by invoking a second method having logic for retrieving the second message according to the second protocol, wherein the second method is different from the first method; and
      storing the first and second messages locally.

2. The system of claim 1, wherein the method further comprises:
   sending the first and second messages to a local server.

3. The system of claim 2, wherein sending the first and second messages to a local mail server comprises:
   invoking a third method having a first format-specific logic for delivering the first message to the local server; and
   invoking a fourth method having a second format-specific logic for delivering the second message to the local server.

4. The system of claim 3, wherein the third and fourth methods are invoked by a mail delivery manager.

5. The system of claim 1, wherein the first and second methods are invoked according to a schedule.

6. The system of claim 1, wherein the first and second methods are invoked by a mail download manager.

7. The system of claim 1, wherein the first and second methods are invoked as separate threads.

8. The system of claim 1, wherein storing the first and second messages locally comprises placing the first and second messages in a local mail queue.

9. The system of claim 1, wherein the first protocol is the Post-Office-Protocol Version 3 (POP3) protocol.

10. The system of claim 9, wherein the second protocol is the Web Distribution and Authoring Versioning (Web DAV) protocol.

11. A method of retrieving messages from a first account and a second account, the method comprising:
    retrieving a first message from the first account supporting a first protocol, wherein the first message is retrieved by invoking a first method having logic for retrieving the first message according to the first protocol;
    retrieving a second message from the second account supporting a second protocol, wherein the second protocol is different from the first protocol, and wherein the second message is retrieved by invoking a second method having logic for retrieving the second message according to the second protocol, wherein the second method is different from the first method; and
    storing the first and second messages locally.

12. The system of claim 11, wherein the method further comprises sending the first and second messages to a local server.

13. The method of claim 12, wherein sending the first and second messages to a local mail server comprises:
    invoking a third method having a first format-specific logic for delivering the first message to the local server; and
    invoking a fourth method having a second format-specific logic for delivering the second message to the local server.

14. The method of claim 13, wherein the third and fourth methods are invoked by a mail delivery manager.

15. The method of claim 11, wherein the first and second methods are invoked according to a schedule.

16. The method of claim 11, wherein the first protocol is the Post-Office-Protocol Version 3 (POP3) protocol.

17. The method of claim 11, wherein the first method does not have logic for retrieving messages according to the second protocol, and wherein the second method does not have logic for retrieving messages according to the first protocol.

18. A computer storage medium encoding computer executable instructions that, when executed by at least one processor, perform a method comprising:

retrieving a first message from the first account supporting a first protocol, wherein the first message is retrieved by invoking a first method having logic for retrieving the first message according to the first protocol;

retrieving a second message from the second account supporting a second protocol, wherein the second protocol is different from the first protocol, and wherein the second message is retrieved by invoking a second method having logic for retrieving the second message according to the second protocol wherein the second method is different from the first method; and storing the first and second messages locally.

19. The computer storage medium of claim 18, wherein the method further comprises sending the first and second messages to a local server.

20. The computer storage medium of claim 19, wherein sending the first and second messages to a local mail server comprises:

invoking a third method having a first format-specific logic for delivering the first message to the local server; and invoking a fourth method having a second format-specific logic for delivering the second message to the local server.

* * * * *